(12) United States Patent
Clemm et al.

(10) Patent No.: US 8,908,565 B2
(45) Date of Patent: Dec. 9, 2014

(54) METHODS AND APPARATUS FOR EFFICIENT DECENTRALIZED INFORMATION DISSEMINATION IN A NETWORK

(75) Inventors: L. Alexander Clemm, Los Gatos, CA (US); Alberto Gonzalez Prieto, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 175 days.

(21) Appl. No.: 13/549,643

(22) Filed: Jul. 16, 2012

(65) Prior Publication Data

US 2014/0016510 A1  Jan. 16, 2014

(51) Int. Cl.
- *H04L 12/26* (2006.01)
- *H04L 12/721* (2013.01)
- *H04L 29/08* (2006.01)

(52) U.S. Cl.
CPC .......... *H04L 45/124* (2013.01); *H04L 67/1072* (2013.01); *H04L 45/127* (2013.01)
USPC ....................................................... 370/255

(58) Field of Classification Search
CPC .. H04L 45/124; H04L 45/127; H04L 67/1072
USPC ....................................................... 370/255
See application file for complete search history.

(56) References Cited

U.S. PATENT DOCUMENTS

| | | | | |
|---|---|---|---|---|
| 8,010,633 | B2 * | 8/2011 | Van Datta et al. | 709/220 |
| 2007/0110063 | A1 * | 5/2007 | Tang et al. | 370/390 |
| 2009/0016346 | A1 * | 1/2009 | Tang et al. | 370/390 |
| 2011/0191418 | A1 * | 8/2011 | Yang et al. | 709/204 |

* cited by examiner

*Primary Examiner* — Mark Rinehart
*Assistant Examiner* — Matthew Hopkins
(74) *Attorney, Agent, or Firm* — Meunier Carlin & Curfman, LLC (57) ABSTRACT

Methods and apparatus for efficient decentralized information dissemination in a network are discussed herein. The decentralized information dissemination techniques are based on non-deterministic protocols such as gossip-based protocols. An example method for dissemination of information in a network can include: selecting a destination node from a set of neighboring nodes using a gossip-based protocol; transmitting a message to the destination node; and receiving a feedback response from the destination node. The feedback response can include a level of usefulness of the message to the destination node. In addition, each neighboring node in the set can be associated with a selection weight, and the selection weights can be related to a probability of selecting each neighboring node in the set as the destination node using the gossip-based protocol. Upon receiving the feedback response, the method can include adjusting the selection weight of the destination node based on the feedback response.

16 Claims, 4 Drawing Sheets

METHODS AND APPARATUS FOR EFFICIENT DECENTRALIZED INFORMATION DISSEMINATION IN A NETWORK

BACKGROUND

There are many networking scenarios that require dissemination of information across the network. In addition, there are many approaches to disseminating information across the network. Many solutions use a centralized architecture, whereby a central component distributes information to each interested node on a one-on-one basis. Publish/subscribe techniques are a variation of solutions using a centralized architecture.

More recently, information dissemination solutions using decentralized techniques have emerged. For example, ad hoc networks and sensor networks employ decentralized techniques such as gossip-based protocols, for example, to disseminate information. Gossip-based protocols represent a departure from more conventional methods of information dissemination. Rather than relying on mechanisms that are structurally deterministic and involve very structured communication of information, gossip-based protocols rely essentially on chance interactions between nodes to disseminate information. Gossip-based protocols facilitate information dissemination in a non-deterministic way based on random interactions between nodes. Thus, the dissemination of information resembles the spread of a virus across a population as opposed to an organized campaign. Gossip-based protocols have proven no less effective than deterministic and structured dissemination solutions.

Gossip-based protocols have advantages over deterministic and structured dissemination solutions. Gossip-based protocols have a high degree of robustness, a relatively small footprint, and the randomized component allows for discovery of the network topology and dissemination paths across the network. For example, the footprint of a gossip-based protocol is relatively small in comparison to the footprints of other techniques. Additionally, there is no single bottleneck or point-of-failure, such as a centralized server, on which communication in a centralized architecture depends. Accordingly, information dissemination in a decentralized, gossip-based system is robust because it is not overly affected by individual node failures.

However, there are some disadvantages to using gossip-based protocols. For example, gossip-based protocols tend to be somewhat "wasteful" in general because the same content is forwarded many times to nodes that have already received the information (i.e., similarly to a virus being transmitted to an individual already infected by the virus). In addition, gossip-based protocols are obtuse to the underlying network topology, treating all neighboring nodes the same. Further, gossip-based protocols lack guarantees that the information will eventually be delivered to any given node. Gossip-based protocols also tend to impose propagation delays, which can at times be substantial. Despite the disadvantages, there are many networking scenarios that involve the dissemination of information where it is perfectly acceptable for information dissemination to be performed without any guarantees of delivery to any given node, as long as there is a high likelihood that most nodes eventually receive the information (which is practically a given in scenarios with high networking redundancy).

In reality, some links and nodes are more critical than others for disseminating information. If the more critical links and nodes were exploited, gossip-based protocols would be even more robust and efficient, e.g., by ensuring that information is always communicated across links more critical to information dissemination. Thus, an information dissemination technique that exploits the advantages of gossip-based protocols while improving robustness and efficiency is desirable.

SUMMARY

Methods and apparatus for efficient decentralized information dissemination in a network are discussed herein. The decentralized information dissemination techniques are based on non-deterministic protocols such as gossip-based protocols, which allow dissemination of information in a non-deterministic manner based on random interactions between nodes. Unlike traditional gossip-based protocols, which do not differentiate between neighboring nodes and network topologies (i.e., all nodes and links are treated equally), the techniques disclosed herein make distinctions between the nodes and links and automatically adjust the information dissemination overlay based on feedback loops concerning the efficiency of information dissemination. In addition, the techniques disclosed herein provide advantages over traditional multicasting protocols because the techniques do not require building and maintenance of a dissemination tree. Further, the techniques disclosed herein provide advantages over traditional broadcasting protocols because the techniques do not treat all links and nodes equally.

An example method for dissemination of information in a network can include: selecting a destination node from a set of neighboring nodes using a gossip-based protocol; transmitting a message to the selected destination node; and receiving a feedback response from the selected destination node. The feedback response can optionally include a level of usefulness of the message to the selected destination node. In addition, each neighboring node in the set can be associated with a selection weight, and the selection weight associated with each neighboring node in the set can be related to a probability of selecting each neighboring node in the set as the destination node using the gossip-based protocol. Upon receiving the feedback response, the method can include adjusting the selection weight of the selected destination node based on the feedback response.

In some implementations, the neighboring nodes in the set associated with higher selection weights have higher probabilities of being selected as the destination node than neighboring nodes in the set associated with lower selection weights.

Additionally, the feedback response can include a score related to the level of usefulness of the message to the selected destination node. The message may be more useful to the selected destination node when it is a new, non-redundant message. Additionally, the message may be more useful to the selected destination node when it is not eventually received by the selected destination node from a different source node. The message may also be more useful to the selected destination node if the message is useful to neighboring nodes. For example, the score can be 0 if the message was previously known to the selected destination node, and the score can be 1 if the message was previously unknown to the selected destination node.

Optionally, the selection weight associated with each neighboring node can be a ratio of a sum of scores of received feedback responses to a total number of received feedback responses.

Alternatively or additionally, the selection weight associated with each neighboring node can be normalized by a sum of the selection weights associated with the neighboring nodes in the set.

In some implementations, the ratio can be calculated for a predetermined number of transmitted messages. While in other implementations, the ratio can be calculated for messages transmitted during a predetermined period of time.

Optionally, the message can also include configuration or monitoring information.

In another implementation, a method for dissemination of information in a network can include: receiving a message from a source node; selecting a destination node from a set of neighboring nodes using a gossip-based protocol; transmitting the message to the selected destination node; transmitting a response to the source node; and receiving a feedback response from the selected destination node. The response can optionally include a level of usefulness of the message, and the feedback response can optionally include a level of usefulness of the message to the selected destination node. In addition, each neighboring node in the set can be associated with a selection weight, and the selection weight associated with each neighboring node in the set can be related to a probability of selecting each neighboring node in the set as the destination node using the gossip-based protocol. Upon receiving the feedback response, the method can include adjusting the selection weight of the selected destination node based on the feedback response.

Additionally, the response can be a score related to the level of usefulness of the message, and the feedback response can be a score related to the level of usefulness of the message to the selected destination node.

In some implementations, the response can be transmitted to the source node without delay.

In other implementations, the response can be transmitted to the source node after lapse of a period of time, and the score included in the response can incorporate the feedback response received from the selected destination node.

In yet other implementations, the response can be transmitted to the source node after lapse of a period of time, and the score included in the response can be adjusted based on whether the same message is received from a different source node during the period of time.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for disseminating information in a network using gossip-based protocols, it will become evident to those skilled in the art that the implementations are not limited thereto, but are applicable for disseminating information in a network using other non-deterministic protocols.

Figure 1:
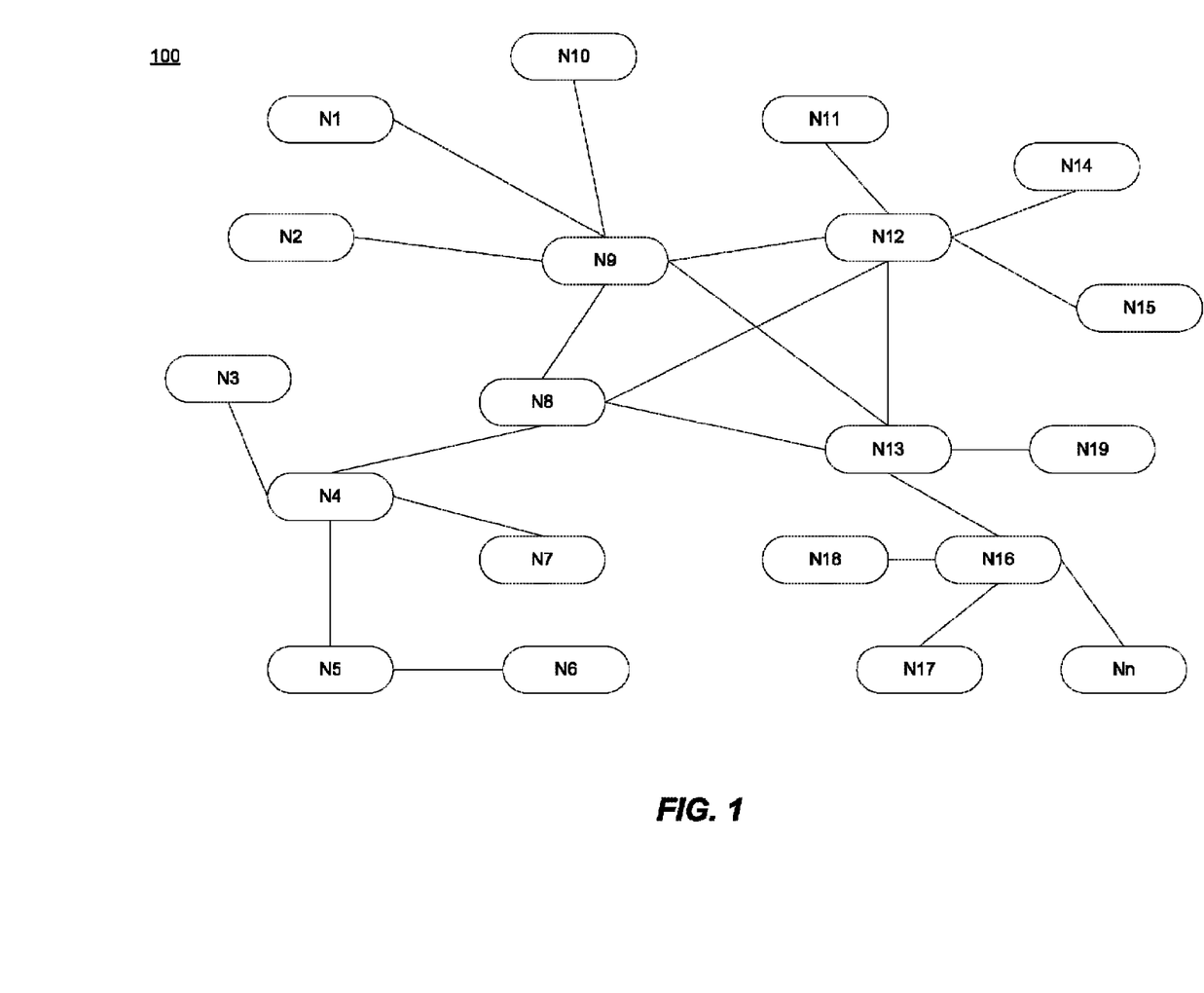
FIG. 1 is a block diagram illustrating an example network topology.

Referring now to FIG. 1, a block diagram illustrating an example network topology 100 is shown. It should be understood that the network topology 100 can be the physical network topology or an overlay network topology, which does not necessarily correspond to the physical network topology. The network includes a plurality of nodes $N_1$-$N_n$. The nodes $N_1$-$N_n$ are communicatively connected through a communication network such as a local area network (LAN), metropolitan area network (MAN), wide area network (WAN), etc. For example, the communication network can be a LAN, for example, in some implementations. Alternatively, the communication network can be a WAN such as the Internet in other implementations. In this case, one or more of the nodes $N_1$-$N_n$ can optionally be connected to the communication network via LANs. It should be understood that any of the nodes $N_1$-$N_n$ can join or leave the communication network at any time, which results in altered network topology. It should also be understood that the number of nodes $N_1$-$N_n$, and the number of neighboring nodes connected to each of the nodes $N_1$-$N_n$ is variable.

Each of the nodes $N_1$-$N_n$ is communicatively connected to one or more neighboring nodes via communication links. The communication links can be any type of wired or wireless link such as, but not limited to, Ethernet, Wi-Fi, WiMAX, 3G, 4G, etc. The nodes $N_1$-$N_n$ can include a desktop computer, a laptop computer, a tablet, a mobile computing device, or any other type of computing device. In addition, the nodes $N_1$-$N_n$ can include network devices such as routers, switches, hubs, gateways, etc. for forwarding and/or routing packets over the communication network.

In FIG. 1, some of the nodes such as nodes N1, N2 and N10, for example, are communicatively connected to a single node such as N9, for example. These nodes, therefore, are dependent on receiving disseminated information from the single node. On the other hand, some nodes such as N8, N9, N12 and N13, for example, are communicatively connected to multiple nodes. These nodes, therefore, are not dependent on any single node for receiving disseminated information, and may instead receive disseminated information from multiple nodes. It should be understood that the communication network discussed above with reference to FIG. 1 is only one example communication network and that numerous other communication network configurations exist.

The decentralized communication techniques disclosed herein can be used in autonomic and self-organizing networks. The decentralized communication techniques may be completely decentralized and may rely on peer-to-peer communication between neighboring nodes. The decentralized communication techniques can optionally use gossip-based protocols to select one or more nodes from a set of neighboring nodes as a destination node for disseminating information. In extreme cases, all of the nodes in the set of neighboring nodes (i.e., flooding) or only one node in the set of neighboring nodes (i.e., unicasting) can be selected as the destination node(s). Additionally, depending on resource availability, any number of nodes in the set of neighboring nodes can be selected as the destination node(s). The one or more destination nodes are typically randomly chosen from the set of neighboring nodes. When using gossip-based protocols, there is no centralized communication controller, so each node acts only on the state or information stored by the node when selecting the destination node. As an example, referring to FIG. 1, node N9 may select one or more nodes from a set of neighboring nodes including nodes N1, N2, N8, N10, N12 and N13 as a destination node for disseminating information. In some implementations, the selection of one or more nodes as the destination node may depend on resource availability. For example, in times of high load and/or congestion, a source node may choose to not disseminate information at all, or alternatively, to disseminate information to a single node after a delay period (which may be long). On the other hand, in times of low load, a source node may choose to disseminate information to multiple nodes without delay.

Unlike traditional decentralized communication techniques using gossip-based protocols, which treat all neighboring links and nodes equally, the decentralized communication techniques discussed herein utilize feedback to make the techniques more robust and efficient. For example, transmission of information (i.e., a message) from a source node to a destination node results in feedback including a level of usefulness of the information to the destination node. The destination node can be configured to transmit the feedback to the source node upon receipt of the information with or without delay, as discussed below. Additionally, the feedback can be used by the source node to adjust a selection weight of the destination node. The source node can maintain the feedback in memory, for example. The selection weight of each of the nodes in the set is related to the probability that any particular node will be selected as the destination node. Further, the feedback is distinct from an acknowledgement in response to receiving a message. It should be understood that there are a number of known protocols for acknowledging receipt of a message. The feedback, however, provides information to a source node for adjusting a selection weight of the destination node, while the acknowledgement provides information to a source node to determine whether to retransmit the same message. Accordingly, the decentralized communication techniques result in faster dissemination of information over time (i.e., faster paths are preferred over slower paths), more efficient dissemination (i.e., paths that increase the likelihood of providing new information to nodes are preferred over paths that increase the likelihood of providing redundant information to nodes) and more reliable dissemination (i.e., over time information is virtually guaranteed to traverse critical links which might otherwise have a lower chance of selection).

The feedback including the level of usefulness of the information to the destination node refers to how efficiently the information was disseminated. For example, the feedback can be a score, where higher scores are associated with higher usefulness and lower scores are associated with lower usefulness. Higher usefulness refers to the fact that the information received by the destination node is new, non-redundant information (i.e., unknown to the destination node at the time of receipt), and lower usefulness refers to the fact that the information received by the destination node is redundant information (i.e., known to the destination node at the time of receipt). For example, the destination node can be configured to make a determination as to whether the received message was previously received by the destination node (i.e., known to the destination node at the time of receipt). In one implementation, the score is 1 when the information is useful (new, non-redundant information), and the score is 0 when the information is not useful (redundant information). The feedback including the score can be provided by the destination node without delay, or alternatively, after a period of delay. When the feedback is provided without delay, the feedback is provided promptly upon receipt of the information as opposed to after lapse of a period of time. On the other hand, when the feedback is provided after a period of delay, it is possible to incorporate feedback regarding the level of usefulness of the information to nodes downstream from the destination node (e.g., feedback received by the destination node from one or more of its neighboring nodes).

To determine whether the received message was previously received, the destination node can compare an identification number of the message to identification numbers of messages previously received. It should be understood that the destination node (or source node or any other node) can maintain this information in a table or database, for example. The information in the table or database can be aged out over time to prevent the table or database from increasing beyond a manageable size. For example, messages having ages/timestamps older than a predetermined age can be removed. Alternatively or additionally, messages can include time-to-live (TTL) data based on events (e.g., hops) to limit lifespan of the messages. When using a TTL scheme, a node decrements (or increments) a TTL indicator that is included with the message upon forwarding the message, and when the TTL indicator attains a predetermined value, the message is not forwarded by a subsequent neighboring node. The destination node (or source node or any other node) can use the table or database of message identification numbers to determine whether the received message was previously received. In some implementations, if the destination node determines that the message was previously received or if the destination node determines that the TTL indicator equals the predetermined value, the destination node drops the message without transmitting the message to its neighboring nodes. In other words, the destination node terminates further propagation of the message. In this case, the destination node, however, can send a feedback response to the source node indicating that the message was not useful, for example. Besides the weights of each of the neighboring nodes, no other state information needs to be maintained by the nodes. For example, the nodes do not need to maintain any data included in the messages or even information as to whether messages were transmitted (except if the fact that a response is received to a message is used in a weight calculation).

In other implementations, the score is not limited to 0 or 1, and instead can be a range of values related to the level of usefulness of the information to the destination node. In particular, the score can incorporate feedback received by the destination node when it disseminates the same information to one or more of its neighboring nodes. For example, information is more useful to the destination node when it is new, non-redundant information. Additionally, the information is more useful to the destination node when it is not eventually received by the destination node from a different source node. The information is also more useful to the destination node when the information is useful to neighboring nodes. After the destination node transmits the information, the destination node can collect feedback from its neighboring nodes and use the collected information to adjust the score provided to the source node. When the destination node incorporates feedback collected from its neighboring nodes into the score, the destination node can indicate the usefulness of the information at the time of receipt of the information (e.g., whether the information is new, non-redundant information), as well as the usefulness of the information to its neighboring nodes (e.g., downstream nodes). Alternatively or additionally, the score can be adjusted based on whether the destination node received the same information from a different source node during a predetermined period of time following receipt of the information from the source node.

It should be understood that there are many different schemes or methods for computing the level of usefulness of the information (e.g., the score) to the destination node. As discussed above, the level of usefulness of the information at the time of receipt of the information can be 1 (new, non-redundant information) or 0 (redundant information) (e.g., a base component). The base component can then be adjusted based on whether the information is useful to neighboring nodes and/or whether the destination node receives the same information from a different source node. The base component can incorporate the level of usefulness to neighboring nodes (e.g., a transitive component). For example, the transitive component can be a sum of the level of usefulness of the information to neighboring nodes multiplied by a factor (e.g., a factor between 0 and 1 such as 0.2, for example). Additionally, the transitive component can be capped at a maximum value (e.g., 3, for example) to prevent the transitive component from dominating the level of usefulness. The level of usefulness can also be adjusted based on whether the same information is subsequently received from a different source node (i.e., duplicate component). For example, if the same information is subsequently received from a different source node, the duplicate component can be a sum of the number of duplicate messages multiplied by a factor (e.g., a factor between 0 and 1 such as 0.2, for example). Similarly to the transitive component, the duplicate component can be capped at a maximum value (e.g., 2, for example). For example, if the destination node is a hub, the destination node can receive the same information from a number of different source nodes. Thus, by capping the duplicate component at a maximum value, it is possible to prevent the duplicate component from dominating the level of usefulness. The level of usefulness can be defined by Eqn. (1) below. It should be understood that Eqn. (1) is only an example and that other schemes for calculating the level of usefulness are available.

$$\text{Level of Usefulness} = \{\text{Base Component}\} + \{\text{Transitive Component}\} - \{\text{Duplicate Component}\} = \{0 \text{ or } 1\} + \{\text{Transitive Factor} \times \text{Sum of Scores Received from Neighboring Nodes}\} - \{\text{Duplicate Factor} \times \text{Sum of the Number of Duplicate Messages}\} \quad (1)$$

Assume, for example, that the Transitive and Duplicate Factors are 0.2. Additionally, assume that the destination node receives feedback from neighboring nodes of 2 and 5, and that the destination node receives the same information from one other source node. The level of usefulness (assuming the information at the time of receipt is new, non-redundant information such that the base component is 1)=$\{1\}+\{0.2\times(2+5)\}-\{0.2\times(1)\}=2.2$. Additionally, as discussed above, the transitive component can be capped at a maximum value (e.g., 3), and the duplicate component can be capped at a maximum value (e.g., 2). For example, assuming the destination node receives feedback from neighboring nodes of 2 and 1000 (i.e., the transitive component exceeds 3) and the destination node receives the same information from 500 different source nodes (i.e., the duplicate component exceeds 2), the level of usefulness=$\{1\}+\{3\}-\{2\}=2$. As discussed above, it should be understood that there are many different schemes or methods for computing the level of usefulness of the information (e.g., the score) to the destination node. Additionally, the values of the factors and/or the maximum values can be predefined (i.e., hard-coded) or user-configurable. The example above (including the equation, values of the factors, received feedback, number of duplicates, etc.) are not intended to limit the disclosure and are only provided as an example scheme.

In the examples above, the destination node provides the feedback including the score after a period of delay. The period of delay (i.e., the time period) can be a fixed, predetermined time period or a randomized time period. Using the same fixed, predetermined time period in all nodes should be avoided if incorporating feedback from downstream nodes into the feedback is desired because the destination node will transmit the feedback to the source node before receiving feedback from its neighboring nodes. Thus, the randomized time period may be desirable even if feedback from neighboring nodes is not always received before expiration of the time period. Thus, the score can be used to distinguish between nodes which are more critical information hubs in the network topology from nodes which have a single connection (and thus are dependent on a particular neighboring node for receiving information) but less critical for propagating information across the network. As an example, referring to FIG. 1, it may be desirable to distinguish between node $N_{16}$ and $N_{19}$ because nodes $N_{17}$, $N_{18}$, $N_n$ depend on node $N_{16}$ to receive information. Node $N_{16}$ may be an edge router in the communication network, for example. In contrast, no nodes depend on node $N_{19}$ to receive information. It may be more critical to disseminate information to $N_{16}$ to ensure that information is disseminated across the entire network than to disseminate information to $N_{19}$. Thus, by incorporating the feedback received by node $N_{16}$ from nodes $N_{17}$, $N_{18}$, $N_n$ into the feedback provided by node $N_{16}$ to node $N_{13}$, it is possible to strengthen the link between nodes $N_{16}$ and $N_{13}$ as compared to the link between nodes $N_{19}$ and $N_{13}$.

The source node can be configured to store or maintain the feedback including the scores received from each destination node. For example, the source node can maintain feedback received from each of its neighboring nodes in memory. The source node can use the feedback to assign a "weight" to each of the neighboring nodes that is related to the probability of selecting each of the nodes as the destination node. Higher selection weights are associated with higher probabilities of selecting a particular node as the destination node. In other words, the selection weight of a particular node is related to the probability that the particular node is selected as the node to which information is transmitted. The selection weight is a probabilistic concept. In particular, the selection weight is an indication of the likelihood that the particular node will be selected as the destination node. The selection weight is not used as a tiebreaker to choose between nodes or used to determine a particular transmission order, which is important to maintain the non-deterministic behavior of the gossip-based protocols.

Over a period of time, the selection weight of a node providing consistently high feedback (i.e., high scores) becomes higher than selection weights of nodes providing mixed or low feedback (i.e., both high and low scores or only low scores). By providing consistently high feedback or positive feedback, the link is strengthened because the probability of selecting the node as the destination node as compared to the other nodes in the set of neighboring nodes is increased. On the other hand, by providing consistently low feedback or negative feedback, the link is loosened because the probability of selecting the node as the destination node as compared to the other nodes in the set of neighboring nodes is decreased. It is therefore possible to automatically adapt to the network topology and/or changes in the network topology without requiring each of the nodes (or any particular node) to have accurate knowledge of the network topology. Instead, each of the nodes is aware of the neighboring nodes (i.e., the nodes in the vicinity to which information can be disseminated).

The decentralized dissemination techniques that utilize feedback responses to adjust/adapt to the network topology and changes in the network topology exhibit delayed response variations as information propagates across the network. In particular, the selection weight of each neighboring node is adjusted over time such that nodes providing consistently high feedback are preferred over nodes providing consistently low feedback. Because the adjustments are made based on the collected feedback responses, it takes time for the techniques to adjust/adapt to changes. For example, when a new neighboring node is discovered by a source node, an initial selection weight can be assigned. Then, the initial selection weight can optionally be held constant for a period of time following discovery of the new node to allow for collection of feedback responses from the new node before adjusting the selection weight of the new node. Alternatively or additionally, the initial selection weight can be adjusted upon receipt of any feedback responses from the new node. Similarly to discovery of a new node, the dissemination techniques can discover lost nodes. Over time, due to the absence of positive feedback from the lost node, the selection weight for the lost node can be decreased, which reduces the probability of selecting the lost node. This is discussed in detail below. Eventually, after an extended period of time during which no feedback responses are received, the node can be considered lost, e.g., the node is removed as a neighboring node in the set. It should be understood that a lost node is different than a node having a low selection weight in that the node having a low selection weight is still selected as a destination node once in a while. Additionally, if the lost node is announced through a network event, the lost node can be removed as a neighboring node in the set without reducing its selection weight over time (and then removing the lost node), which optimizes the technique.

As discussed above, any node that disseminates information (i.e., a source node) maintains feedback received from its neighboring nodes. It should be understood that there are many ways to calculate the selection weight of a particular destination node based on received feedback. For example, the selection weight for a particular destination node can be a ratio of the sum of positive feedback (i.e., the scores included in the feedback) to a total number of received feedback responses. The ratio can be defined as shown below in Eqn. (2).

$$\text{Selection Weight }(j) = \frac{\text{Sum of Positive Feedback for Node } j}{\text{Total Number of Feedback Responses for Node } j} \quad (2)$$

In this way, the absence of feedback can be distinguished from the receipt of negative feedback. Because the ratio uses the total number of received feedback responses for a particular destination node (instead of the total number of messages transmitted to the particular destination node), the absence of feedback from the particular destination node does not affect the selection weight for the particular node. In some implementations, however, repeated and consecutive absence of feedback responses from the particular destination node can result in loosening of the link by decreasing the selection weight for the particular destination node. Repeated and consecutive absence of feedback responses from the particular destination node may be associated with node failure, for example. The number of repeated and consecutive absence of feedback responses or period of time during which feedback is absent after which the selection weight for the particular destination node is decreased can be configured according to the desired responsiveness of the system. It is possible to calculate the ratio discussed above for feedback received from the particular destination node over a predetermined number of messages. Alternatively or additionally, it is possible to calculate the ratio discussed above for feedback received from the particular destination node during a predetermined period of time. It should be understood that the predetermined number of messages and predetermined period of time can have any values. In addition, in some implementations, the selection weights of all of the neighboring nodes in a set, or all of the neighboring nodes of a particular source node, can be weighted. For example, the selection weights of all of the neighboring nodes in the set can be normalized by the sum of the selection weights for all of the nodes in the set. In this manner, the sum of the weighted selection weights for the set of neighboring nodes is 1.

The decentralized dissemination techniques discussed herein are agnostic and independent from the type of data disseminated in the messages. In other words, the information being disseminated is not interpreted when selecting a destination node to which to transmit the information. Instead, a determination is made as to whether the received message was previously received/known by the destination node. The historical feedback regarding usefulness of the information to the neighboring nodes is used to strengthen/weaken links between nodes such that the critical links are preferred over less critical links. The decentralized dissemination techniques may prove beneficial in a wide variety of networking scenarios including dissemination of configuration information and monitoring information. Regarding dissemination of configuration information, the decentralized dissemination techniques can be used to achieve network-wide best effort throttling, for example. In the case of network congestion, the edge routers need to be configured to throttle incoming traffic. The new throttle configuration, therefore, needs to be disseminated to and enforced on the edge routers. Even in the event that a fraction of the edge routers do not receive the new throttle configuration, the overall goal of throttling network traffic and reducing congestion can be achieved. Regarding dissemination of monitoring information, the decentralized dissemination techniques can be used to disseminate global network load or network health behavior in order to guide local node behavior, for example, when providing load-balancing applications. Specifically, the decentralized dissemination techniques can be used to propagate currently experienced network load in a data center across the server blades. A server blade, therefore, can trigger a request to be assigned new jobs when it finds that its local utilization is equal to or below the average utilization. Because the decentralized dissemination techniques discussed herein are more robust and efficient than traditional gossip-based techniques, the techniques discussed herein provided advantages in applications which need to limit additional overhead imposed on the nodes such as when disseminating configuration and/or monitoring information.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 2:
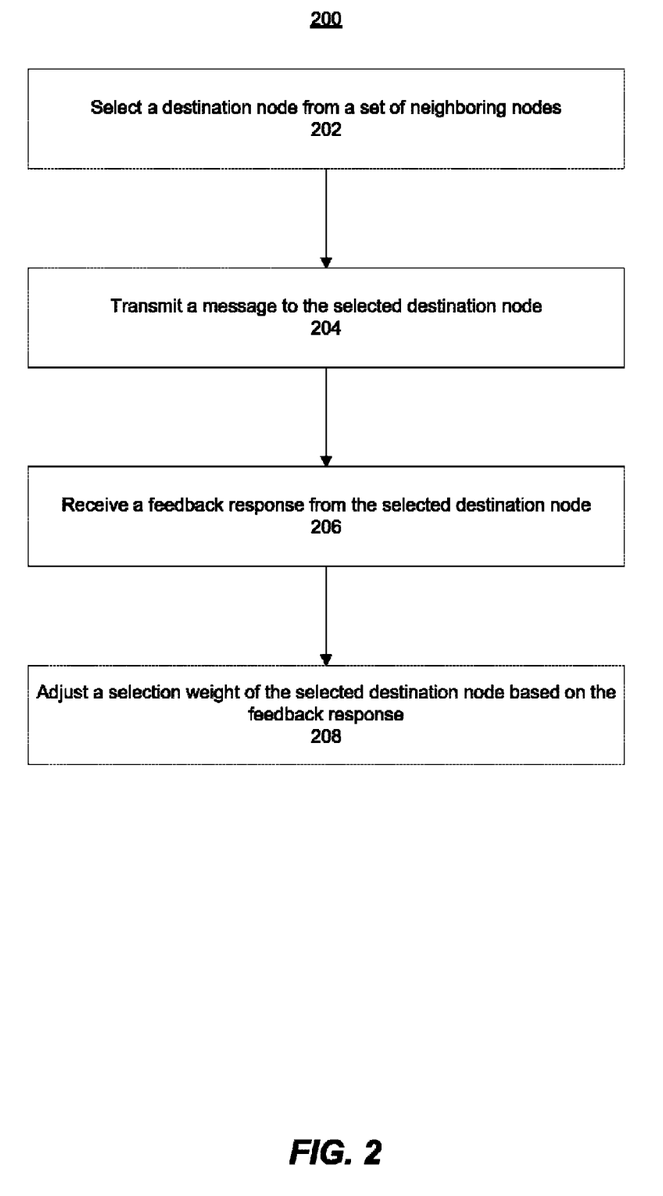
FIG. 2 is a flow diagram illustrating example operations for decentralized dissemination of information according to an implementation discussed herein.

Referring now to FIG. 2, a flow diagram illustrating example operations 200 for disseminating information in a network is shown. At 202, a destination node is selected from a set of neighboring nodes. The destination node can be selected using a non-deterministic protocol such as a gossip-based protocol, for example. In addition, each of the neighboring nodes in the set can be associated with a selection weight, and the selection weight associated with each neighboring node in the set can be related to a probability of selecting each neighboring node in the set as the destination node using the gossip-based protocol. The selection weights can be related to the probability of selecting a particular node as the destination node, where neighboring nodes in the set associated with higher selection weights have higher probabilities of being selected as the destination node than neighboring nodes in the set associated with lower selection weights.

After selecting a destination node, at 204, a message is transmitted to the selected destination node. Then, at 206, a feedback response is received from the selected destination node. The feedback response includes a level of usefulness of the message to the selected destination node. For example, as discussed above, the feedback response can include a score that is related to the level of usefulness of the message. Higher scores can indicate that the information dissemination was more efficient, and lower scores can indicate that the information dissemination was less efficient. The message can be considered useful to the selected destination node (and the information dissemination considered more efficient) when the message is new and non-redundant at the time of receipt. At 208, the selection weight of the selected destination node can be adjusted based on the feedback response. By adjusting the selection weight of the selected destination node based on the feedback response, it is possible to automatically adapt to the network topology and/or changes in the network topology even when using a non-deterministic protocol such as a gossip-based protocol. Thus, more critical links will be preferred for disseminating information over the network, which results in more efficient dissemination.

Figure 3:
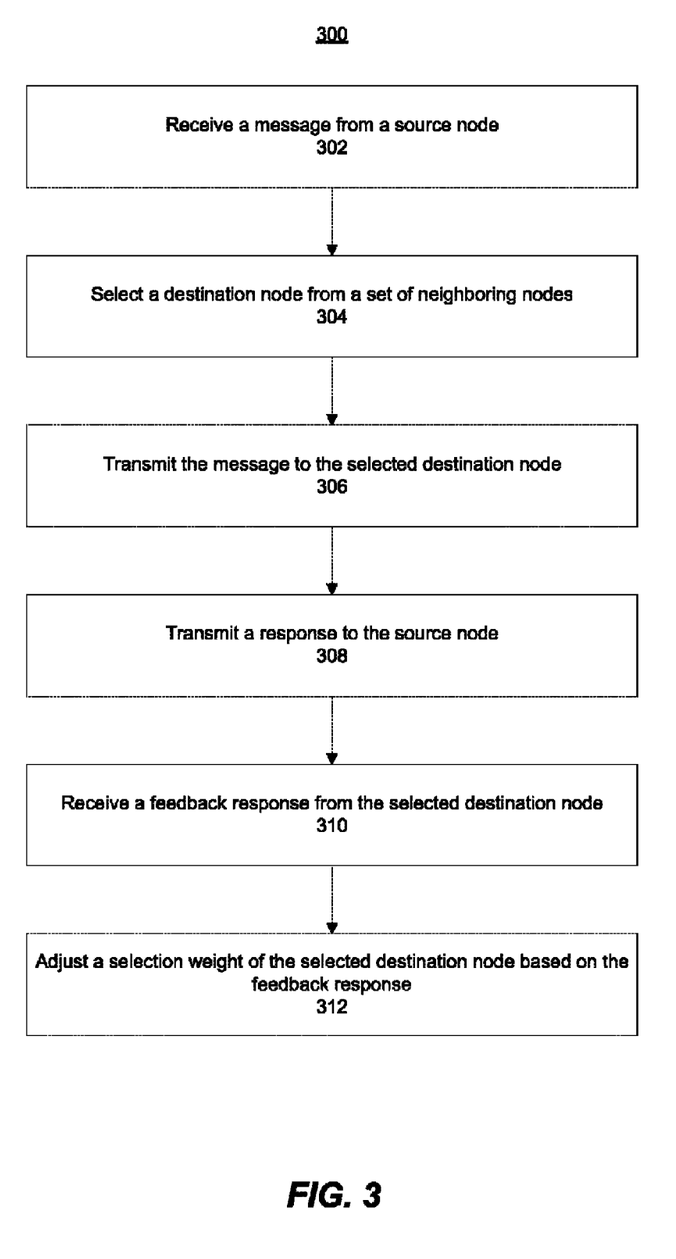
FIG. 3 is a flow diagram illustrating example operations for decentralized dissemination of information according to another implementation discussed herein.

Referring now to FIG. 3, a flow diagram illustrating example operations 300 for disseminating information in a network is shown. Many of the operations shown in FIG. 3 are identical to the operations shown in FIG. 2 and are therefore not discussed in detail below. At 302, a message is received from a source node. Optionally, in some implementations, a determination can be made as to whether the message was previously received (i.e., from the same or different source node). If the message was previously received (or if the TTL indicator is equal to the predetermined value), the message can be dropped without transmitting the message to a destination node, and a feedback response can be transmitted to the source node. At 304, a destination node is selected from a set of neighboring nodes. At 306, the message is transmitted to the selected destination node. At 310, a feedback response is received from the selected destination node. Then, at 312, a selection weight of the selected destination node is adjusted based on the feedback response.

At 308, a response can be transmitted to the source node. The response can include a level of usefulness of the message. For example, as discussed above, the response can include a score that is related to the level of usefulness of the message. Higher scores can indicate that the information dissemination was more efficient, and lower scores can indicate that the information dissemination was less efficient. The message can be considered useful (and the information dissemination considered more efficient) when the message is new and non-redundant at the time of receipt. In some implementations, a determination can be made as to whether the received message is new, non-redundant, and the response can be transmitted without delay. Alternatively, the response can be transmitted after a period of delay. If the response is transmitted after a period of delay, the score can be adjusted to incorporate feedback responses received from the selected destination node (e.g., at 310 above) and/or adjusted based on whether the same message is received from a different source node during the period of delay. It should be understood that transmission of the response to the source node can be delayed until receipt of feedback from one or more downstream nodes.

Figure 4:
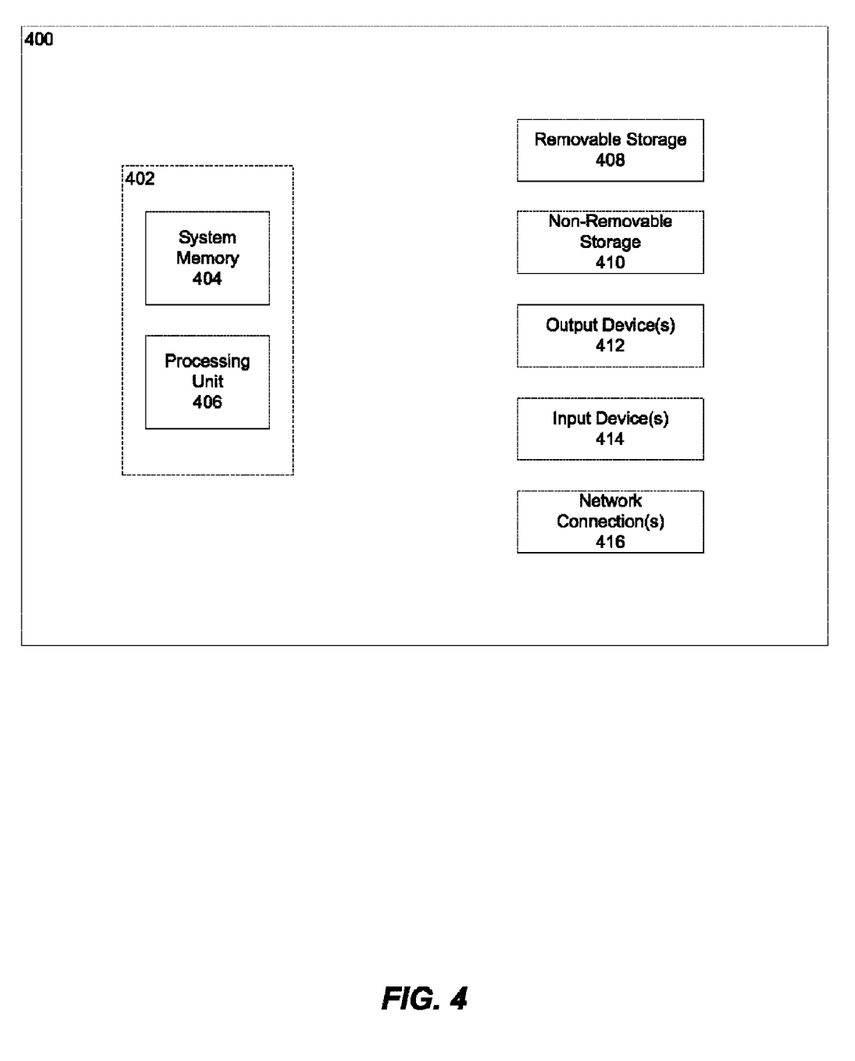
FIG. 4 is a block diagram illustrating an example computing device.

When the logical operations described herein are implemented in software, the process may execute on any type of computing architecture or platform. For example, referring to FIG. 4, an example computing device upon which embodiments of the invention may be implemented is illustrated. In particular, each of the nodes discussed above may be a computing device, such as computing device 400 shown in FIG. 4. The computing device 400 may include a bus or other communication mechanism for communicating information among various components of the computing device 400. In its most basic configuration, computing device 400 typically includes at least one processing unit 406 and system memory 404. Depending on the exact configuration and type of computing device, system memory 404 may be volatile (such as random access memory (RAM)), non-volatile (such as read-only memory (ROM), flash memory, etc.), or some combination of the two. This most basic configuration is illustrated in FIG. 4 by dashed line 402. The processing unit 406 may be a standard programmable processor that performs arithmetic and logic operations necessary for operation of the computing device 400. Alternatively or additionally, the processing unit 406 may be an ASIC that is configured for a particular use as opposed to being configured as a general computing device.

Computing device 400 may have additional features/functionality. For example, computing device 400 may include additional storage such as removable storage 408 and non-removable storage 410 including, but not limited to, magnetic or optical disks or tapes. Computing device 400 may also contain network connection(s) 416 that allow the device to communicate with other devices. Computing device 400 may also have input device(s) 414 such as a keyboard, mouse, touch screen, etc. Output device(s) 414 such as a display, speakers, printer, etc. may also be included. The additional devices may be connected to the bus in order to facilitate communication of data among the components of the computing device 400. All these devices are well known in the art and need not be discussed at length here.

The processing unit 406 may be configured to execute program code encoded in tangible, computer-readable media. Computer-readable media refers to any media that is capable of providing data that causes the computing device 400 (i.e., a machine) to operate in a particular fashion. Various computer-readable media may be utilized to provide instructions to the processing unit 406 for execution. Common forms of computer-readable media include, for example, magnetic media, optical media, physical media, memory chips or cartridges, a carrier wave, or any other medium from which a computer can read. Example tangible, computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication.

In an example implementation, the processing unit 406 may execute program code stored in the system memory 404. For example, the bus may carry data to the system memory 404, from which the processing unit 406 receives and executes instructions. The data received by the system memory 404 may optionally be stored on the removable storage 408 or the non-removable storage 410 before or after execution by the processing unit 406.

Computing device 400 typically includes a variety of computer-readable media. Computer-readable media can be any available media that can be accessed by device 400 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program (s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for disseminating information in a network, comprising:
    selecting a destination node from a set of neighboring nodes using a gossip-based protocol, each neighboring node in the set being associated with a selection weight;
    transmitting a message to the selected destination node;
    receiving a feedback response from the selected destination node, the feedback response including a score related to a level of usefulness of the message to the selected destination node; and
    adjusting the selection weight of the selected destination node based on the feedback response, wherein the selection weight associated with each neighboring node in the set is related to a probability of selecting each neighboring node in the set as the destination node using the gossip-based protocol, wherein the selection weight associated with each neighboring node is normalized by a sum of the selection weights associated with each neighboring node in the set.

2. The method of claim 1, wherein neighboring nodes in the set associated with higher selection weights have higher probabilities of being selected as the destination node than neighboring nodes in the set associated with lower selection weights.

3. The method of claim 1, wherein the score is 0 if the message was previously known to the selected destination node, and the score is 1 if the message was previously unknown to the selected destination node.

4. The method of claim 1, wherein the selection weight associated with each neighboring node comprises a ratio of a sum of scores of received feedback responses to a total number of received feedback responses.

5. The method of claim 4, wherein the ratio is calculated for a predetermined number of transmitted messages.

6. The method of claim 4, wherein the ratio is calculated for messages transmitted during a predetermined period of time.

7. The method of claim 1, wherein the message comprises configuration or monitoring information.

8. A method for disseminating information in a network, comprising:
    receiving a message from a source node;
    selecting a destination node from a set of neighboring nodes using a gossip-based protocol, each neighboring node in the set being associated with a selection weight;
    transmitting the message to the selected destination node;
    transmitting a response to the source node, the response including a level of usefulness of the message;
    receiving a feedback response from the selected destination node, the feedback response including a score related to a level of usefulness of the message to the selected destination node; and adjusting the selection weight of the selected destination node based on the feedback response, wherein the selection weight associated with each neighboring node in the set is related to a probability of selecting each neighboring node in the set as the destination node using the gossip-based protocol, wherein the selection weight associated with each neighboring node is normalized by a sum of the selection weights associated with each neighboring node in the set.

9. The method of claim 8, wherein neighboring nodes in the set associated with higher selection weights have higher probabilities of being selected as the destination node than neighboring nodes in the set associated with lower selection weights.

10. The method of claim 8, wherein the response is transmitted to the source node without delay.

11. The method of claim 8, wherein the response is transmitted to the source node after lapse of a period of time, and the score included in the response incorporates the feedback response received from the selected destination node.

12. The method of claim 8, wherein the response is transmitted to the source node after lapse of a period of time, and the score included in the response is adjusted based on whether the same message is received from a different source node during the period of time.

13. A non-transitory computer-readable medium for disseminating information in a network having computer-executable instructions stored thereon that, when executed by a node device, cause the node device to:

select a destination node from a set of neighboring nodes using a gossip-based protocol, each neighboring node in the set being associated with a selection weight;

transmit a message to the selected destination node;

receive a feedback response from the selected destination node, the feedback response including a score related to a level of usefulness of the message to the selected destination node; and adjust the selection weight of the selected destination node based on the feedback response, wherein the selection weight associated with each neighboring node in the set is related to a probability of selecting each neighboring node in the set as the destination node using the gossip-based protocol, wherein the selection weight associated with each neighboring node is normalized by a sum of the selection weights associated with each neighboring node in the set.

14. The non-transitory computer-readable medium of claim 13, wherein neighboring nodes in the set associated with higher selection weights have higher probabilities of being selected as the destination node than neighboring nodes in the set associated with lower selection weights.

15. The non-transitory computer-readable medium of claim 13, wherein the score is 0 if the message was previously known to the selected destination node, and the score is 1 if the message was previously unknown to the selected destination node.

16. The non-transitory computer-readable medium of claim 13, wherein the selection weight associated with each neighboring node comprises a ratio of a sum of scores of received feedback responses to a total number of received feedback responses.

* * * * *